HERNDON B. ROBINSON.
Churn-Dashers.
No. 145,592. Patented Dec. 16, 1873.
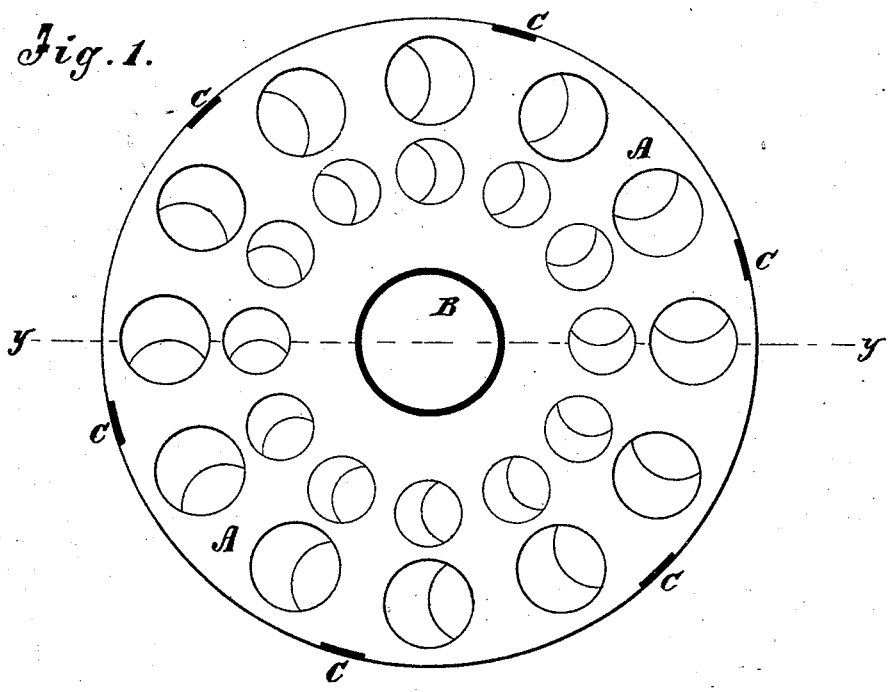
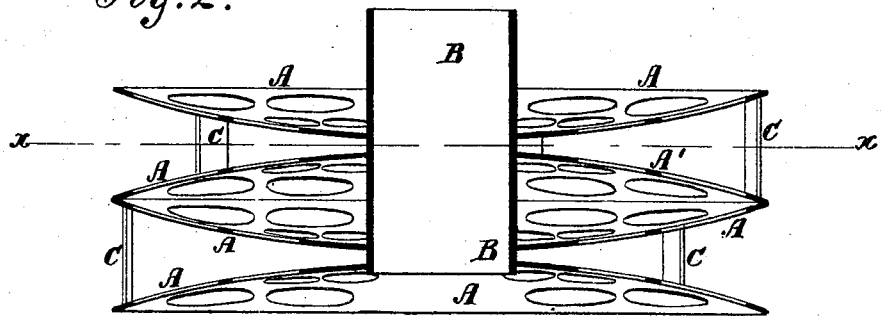
Witnesses:
Inventor:
Mrs. H. B. Robinson
Per
Attorneys.

UNITED STATES PATENT OFFICE.

HERNDON B. ROBINSON, OF BIRMINGHAM, ALABAMA.

IMPROVEMENT IN CHURN-DASHERS.

Specification forming part of Letters Patent No. 145,592, dated December 16, 1873; application filed August 16, 1873.

*To all whom it may concern:*

Be it known that I, Mrs. HERNDON B. ROBINSON, of Birmingham, in the county of Jefferson and State of Alabama, have invented a new and useful Improvement in Churn-Dasher, of which the following is a specification:

Figure 1 is a horizontal section of my improved churn-dasher taken through the line *x x*, Fig. 2. Fig. 2 is a vertical section of the same taken through the line *y y*, Fig. 1.

The invention will first be fully described and then pointed out in the claim.

A are four disks, made of tin or other suitable sheet metal. The disks A are perforated with numerous small holes, and have a larger hole formed in their centers to receive a short tube, B, in which the lower end of the dasher-handle is secured. The disks A are concaved or made saucer shaped, as shown in Fig. 2. The two middle disks are placed upon the tube B with their concave sides toward each other, and are soldered to said tube B with their outer edges in contact with each other, which edges are soldered together. The two outer disks A are placed upon and are soldered to to the tube B above and below the two middle disks, and with their convex sides toward the said middle disks. The disks A should be so arranged upon the tube B that their perforations may not be directly opposite each other. The outer edges of the disks A may be connected and held in their proper relative positions, and the said disks strengthened by short strips of metal C attached to said edges, as shown in Figs. 1 and 2.

A dasher thus constructed will throw the milk into violent agitation, and will also introduce into the milk large quantities of air, so as to bring the butter in a very short time.

I am aware that two perforated concave plates have been placed on a rod with their convex sides together and used as a dasher; but the effect of these is simply to force the milk through the holes, and thus subdivide and bring it more generally into contact with the air.

My object is to supply air to the body of the milk by a perforated chamber, wherein air enters during each uprise of the dasher, and a quantity of which is caught upon the next immersion.

As the real secret of securing the greatest quantity and best quality of butter depends upon the aeration of the milk, or the bringing oxygen into contact with as many particles as possible, this is really accomplished by my invention.

Having thus described my invention, I claim as new and desire to secure by Letters Patent—

The four perforated disks A, the upper and lower having their concavities in opposite directions, while the concavities of the middle ones face each other, and all attached to a rod, B, to serve in the manner described as a churn-dasher.

HERNDON B. ROBINSON.

Witnesses:
H. H. ROBINSON,
M. L. MOORE.